United States Patent
Karp

[15] 3,684,349
[45] Aug. 15, 1972

[54] ANTI-PARALLAX INDEX
[72] Inventor: Edward C. Karp, Belvidere, Ill.
[73] Assignee: Sanitary Scale Company, Belvidere, Ill.
[22] Filed: Aug. 13, 1970
[21] Appl. No.: 63,540

[52] U.S. Cl. ..................350/110, 177/37, 350/114, 350/116
[51] Int. Cl. ............................................G02b 27/02
[58] Field of Search..........................350/110–116; 117/37–39, 42, 102

[56] References Cited
UNITED STATES PATENTS

| | | |
|---|---|---|
| 2,880,643 | 4/1959 | Allen et al...............350/114 |
| 1,690,258 | 11/1928 | Strachan................350/114 X |
| 2,366,947 | 1/1945 | Williams....................350/114 |

Primary Examiner—David Schonberg
Assistant Examiner—Paul R. Miller
Attorney—Hume, Clement, Hume and Lee

[57] ABSTRACT

An anti-parallax index for a cylinder scale or the like wherein an index band lying in a reading plane is mounted for movement about an index axis lying in the plane of the cylinder chart. The band is displaced from the axis so that pivotal movement of the band about the index axis varies the angular relationship of the reading plane to the scale chart while maintaining the zero reference line of the chart in the reading plane.

6 Claims, 3 Drawing Figures

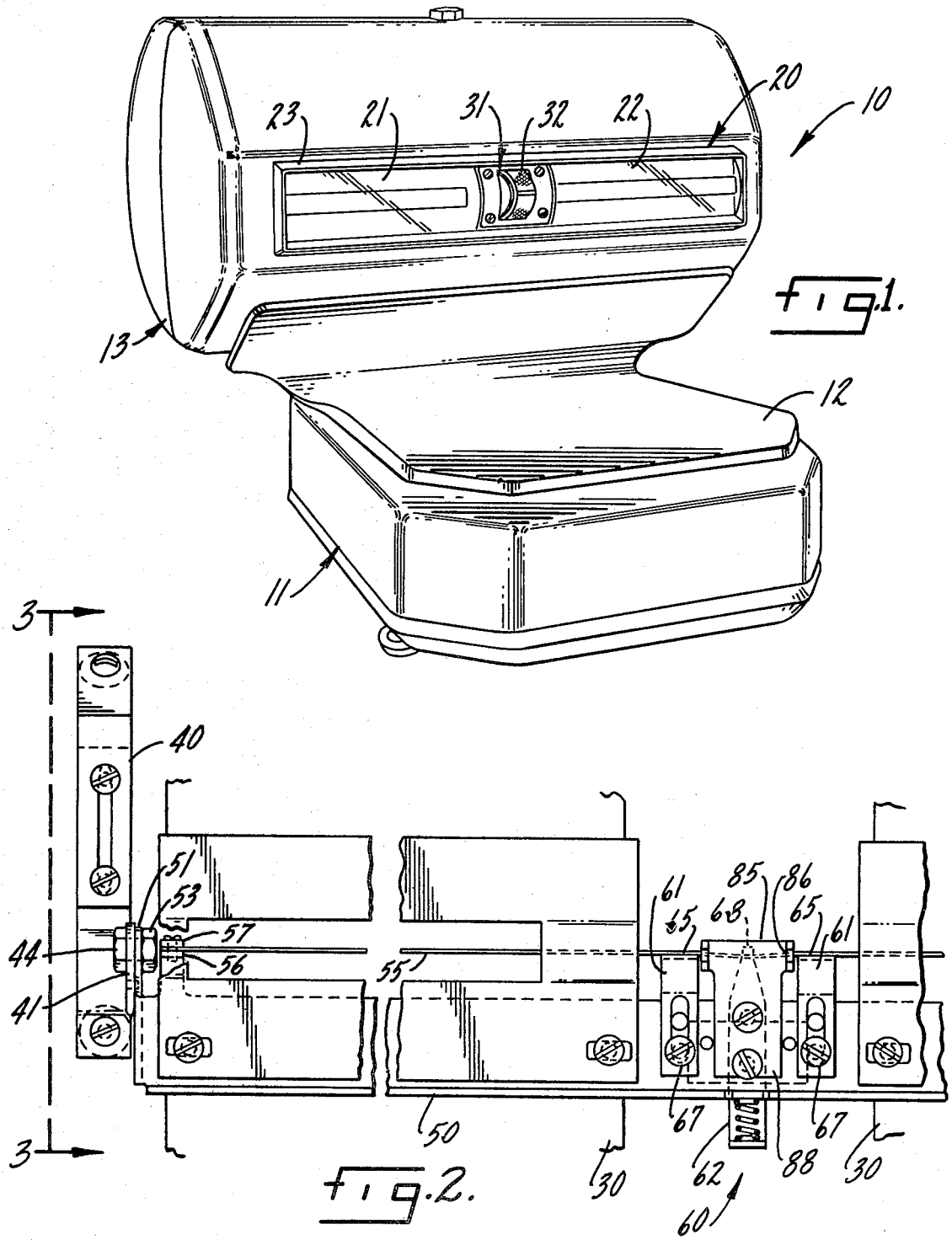

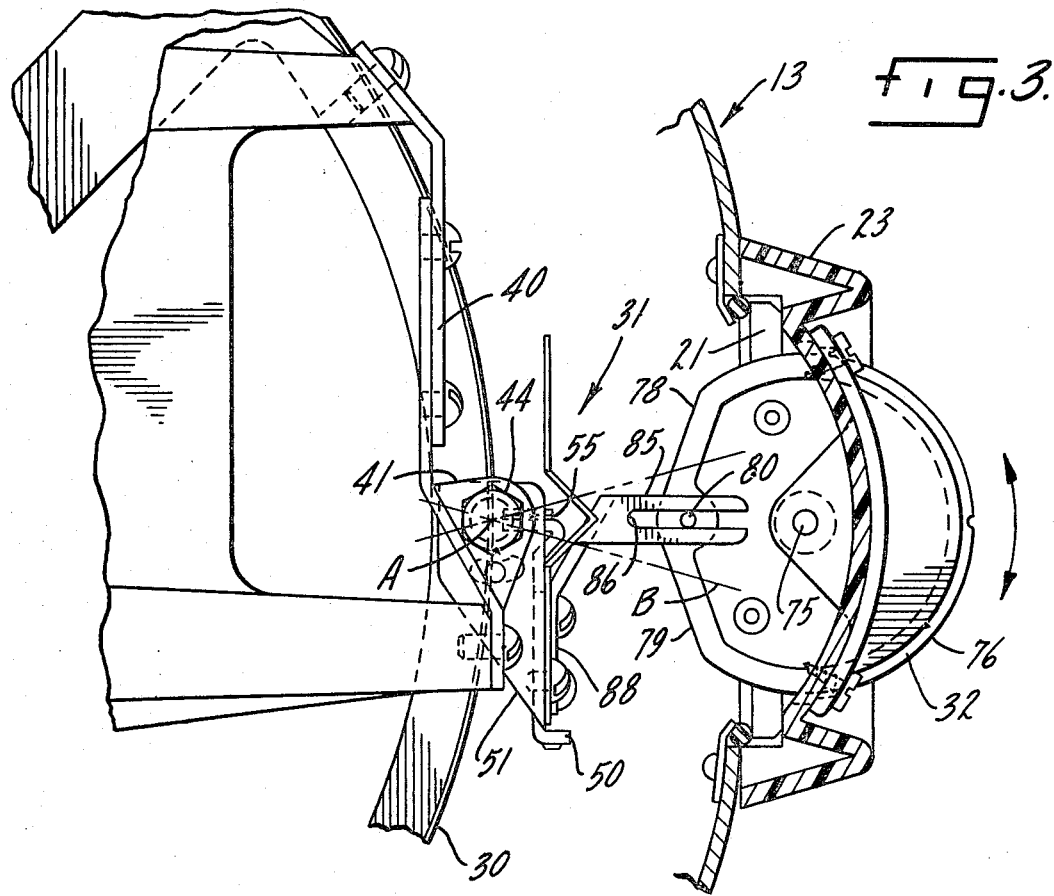

ANTI-PARALLAX INDEX

BACKGROUND OF THE INVENTION

This invention relates in general to apparatus for reading indicating devices and, more particularly, to indexing means therefor. It deals specifically with an index for reading weighing scales or the like.

In a conventional drum scale construction, for example, where a wire is utilized as the index line for reading the scale drum or cylinder chart, parallax error is introduced if the observer does not view the scale in precisely the correct reading plane; i.e., at a prescribed angle to the face of the chart, because the wire is necessarily spaced a short distance from the face of the chart in order to prevent frictional engagement with it. To obviate this parallax error, index devices have been developed which, in effect, force the observer to establish his eyes in the proper reading plane.

One such device is illustrated in the Allen et al. U.S. Pat. No. 2,880,643 on a COMPUTING SCALE wherein an index band of substantially great width and relatively little thickness is utilized. In reading a cylinder scale provided with an index device of this type, if the observer is reading the scale in the proper reading plane and thus getting an accurate reading, he sees only the requisite thin index line extending across the scale chart. However, if the observer's eyes are positioned above or below the proper reading plane; i.e., at some angle other than the prescribed angle to the face of the chart, the band quickly appears not as just a thin line but rather a widening strip which blocks out a portion of the scale chart and indicates to the observer that the chart is being read inaccurately.

Where an index defining band of this type is employed, it is conventional to provide means for adjusting the reading plane to a suitable angle affording a normal reading plane to a normal size observer. Manual internal adjustment means are ordinarily provided inside the index assembly housing. Adjustment is made by hand tool of band spacing from the chart or even angular position of the band. In such known constructions, however, adjustment cannot be effected without running the risk of also altering the relative "-zero" reading point on the periphery of the chart. Typically, a careful series of internal adjustments in the index assembly are necessary to maintain the same "-zero" reading reference, and it is a commonly necessary practice to adjust the zero balance position of the scale for final incremental adjustment. In fact, known systems for adjusting the anti-parallax ribbon angle contemplate adjustment only at initial installation.

SUMMARY OF THE INVENTION

The present invention provides an angularly adjustable, anti-parallax index for cylinder scales wherein the same "zero" reference line is maintained regardless of the selected angular position of the index ribbon or band. This anti-parallax index is embodied in an index assembly which facilitates simple, fast and precise adjustment of the angle of the reading plane to accommodate reading by an observer of any stature, whether the scale be mounted atop a butcher display counter, for example, or on a lower base below the level of the counter top.

The foregoing and other advantages are realized in accord with the present invention by providing an index assembly incorporating a tensioned index ribbon. The band is tensioned over a bracket arrangement which is pivotally mounted for rotation on mounting pins whose pivot axis is parallel to the cylinder axis and disposed at the surface of the cylinder, coincidental with the normal zero adjustment reading line of the cylinder. The index band is positioned on the bracket arrangement opposite the face of the chart cylinder from the pivot axis of the bracket arrangement and lying in a plane extending through the aforementioned pivot axis. Rotation of the bracket arrangement about the pivot axis causes the ribbon to, in turn, pivot about the aforementioned axis at the surface of the cylinder chart coincident with the zero reading line of the chart. Angular adjustment of the bracket arrangement and, accordingly, the index band is effected through a control knob extending outwardly of the index assembly for ready access by the observer.

BRIEF DESCRIPTION OF THE DRAWINGS

The invention, both as to its organization and method of operation, along with further objects and advantages thereof, is best understood by reference to the following description taken in conjunction with the accompanying drawings, in which:

FIG. 1 is a perspective view of a weighing scale including an index assembly embodying features of this invention;

FIG. 2 is an enlarged front elevational view of the index assembly, with parts removed; and FIG. 3 is a sectional view taken along line 3—3 of FIG. 2.

DESCRIPTION OF THE PREFERRED EMBODIMENT

Referring to the drawings, and particularly to FIG. 1, a weighing scale is shown generally at 10. The scale 10 includes a generally rectangular base portion 11 which encloses a weighing mechanism (not shown) supporting a weighing tray 12. A chart and balance housing 13 extends upwardly from the base portion 11 of the scale to the rear of the weighing tray 12.

A rectilinear lens assembly 20 is shown mounted on the vertical face of the housing 13. In the particular scale 10 illustrated, the lens assembly includes a pair of lenses 21 and 22 covered by an appropriately shaped lens cover 23 which might be fabricated of a Bakelite, for example.

Referring to FIGS. 2 and 3, as well as FIG. 1, mounted on and behind the lens assembly 20, immediately in front of the two conventional cylinder charts 30, is the index assembly 31 of the present invention. By manipulation of its adjustment knob 32, mounted in the lens assembly cover 23 in a manner hereinafter discussed in detail, the index assembly 31 is angularly adjusted so that the reading plane of the scale is adjusted angularly to optimum position for viewing by an observer of any stature, with the scale mounted on a high display case or a low counter, for example.

The index assembly 31 spans both of the cylinder charts 30 behind the lens assembly 20, as will readily be recognized. Since each end of the index assembly 31 is identical in construction and arrangement, however, FIG. 2 illustrates only approximately one-half of the index assembly, and a corresponding half-section of the overlying lens assembly 20.

The index assembly 31 is mounted on and extends between an identical pair of mounting brackets 40 (only one shown) secured in a suitable manner within the chart balance housing 13 on opposite ends of the housing, bracketing both cylinder charts 30. Each bracket 40 has, integrally formed therewith, a forwardly extending ear 41, through which an index assembly pivot bolt 44 extends.

The frame 50 of the index assembly 31 is an elongated metal member, fabricated in a conventional manner, and having rearwardly extending flanges 51 formed at its opposite ends and suitably apertured for receiving the pivot bolts 44 extending through the bracket ears 41. Suitable locking nuts 53 threaded onto the inner ends of each of the pivot bolts 44 (only one shown) retain the frame 50 of the index assembly 51 in mounted relationship on the bracket 40 for pivotal rotation about the axis A (see FIG. 3) of the pivot bolts. This axis A lies at the surface of the chart 30, coincident with the zero line on the chart face.

Mounted on and extending the length of the index assembly frame 50 is the index ribbon 55. The ribbon 55 is of conventional composition; it might be Mylar, for example, and is extremely thin while being relatively wide. The tape might, for example, be approximately one-eighth to one-fourth inch in width, while having a thickness of 0.004 to 0.006 inches.

The tape 55 extends between and is secured to tape mounting platforms 56 formed at opposite ends of the index assembly frame 50, immediately adjacent the flanges 51 of the frame. The tape 55 is drawn taut between oppositely disposed platforms 56 (only one shown) and fastened thereon in a suitable manner with screw clamp arrangements 57.

At the center of the index assembly frame 50, intermediate the mounting platforms 56 for the tape 55, is a tape tensioning bracket sub-assembly 60. The bracket sub-assembly 60 includes two vertically adjustable platform members 61 disposed on opposite sides of a vertically adjustable tensioning member 62.

The platform members 61 are, in practice, adjusted vertically on releasable hold-down bolts 67, so that the flat upper surfaces 65 of their platform portions lie precisely in the plane of the corresponding upper surfaces of the platform members 56 to which opposite ends of the tape 55 are fastened. The tape 55, extending from mounting platforms 56 at opposite ends of the frame 50, passes over the platform surfaces 65 and then under a tensioning pin 68 on the tensioning member 62. The tensioning member 62 is slidably mounted on the frame 50 and biased downwardly under spring tension so that opposite half reaches of the tape 55 are drawn taut.

The opposite reaches of the tape 55 crossing each cylinder chart face are thus fixed in a plane extending through the axis A of rotation of the index assembly frame 60 on its pivot bolts 44. However, as illustrated in FIG. 3, the ribbon 55 is off-set from this axis A in a direction opposite the chart face from the axis A, a distance of approximately 0.060 inches.

It will now be seen that pivoting the index assembly frame 50 about its axis A is effective to vary the angular relationship of the plane in which the ribbon 55 lies, the reading plane, relative to this axis. Since the axis A of rotation of the index assembly frame 50 is pre-established on an imaginary line disposed precisely at the surface of the cylinder chart face and, furthermore, precisely along the pre-established zero reference line of the chart, pivotal movement of the index assembly frame about the axis A is effective to angularly adjust the reading plane of the scale 10 while maintaining it precisely in alignment with the zero reference line of the scale.

To facilitate simple adjustment of the index assembly frame 50 and, accordingly, the index assembly 31 by the observer in order to adjust to his stature or the relatively higher or lower positioning of the scale 10, the observer need merely rotate the adjusting knob 32 upwardly or downwardly. The adjusting knob 32 is generally disc shaped and is pivotally mounted at approximately its center on a pin 75 suitably fixed to the lens assembly cover 23. The disc 32 is knurled, as at 76, over approximately three quadrants of its outer annular periphery. Over the remaining inner quadrant, the disc is relieved, at 78 and 79, to prevent interference with the index assembly frame 50 when the knob 32 is rotated to adjust the index assembly.

At the mid-point of the unknurled quadrant of the disc 32, a pivot pin 80 is mounted extending transversely of the disc on an axis parallel to the axis of the pin 75 upon which the disc is rotatably mounted. Pivotally and slidably connected to the pin 80, in lost-motion relationship, is the index assembly actuator lever 85. An open ended slot 86 on the free end of the lever 85 slides over the pin 80 and the opposite end 88 of the lever is rigidly secured to the frame 50 of the index assembly 31.

Still referring to FIG. 3, with the index assembly positioned as illustrated in solid lines, the index ribbon 55, and, accordingly, the reading plane, is precisely horizontal, If, for example, the scale is mounted on a top of a meat counter, and the observer is relatively short, he need merely rotate the knob 32 upwardly. The lever arm 85 is thus pivoted downwardly into an attitude represented by the line B in FIG. 3, moving the plane of the index ribbon 55 and, accordingly, the reading plane down to the same extent. An accurate reading of the scale chart can be made by the observer without the observer being forced to stretch upwardly.

As is evident, an infinite range of adjustments can be made between selected upper and lower limits. An observer of virtually any stature can accurately read, with ease, a scale set at any reasonable level.

While the embodiment described herein is at present considered to be preferred, it is understood that various modifications and improvements may be made therein.

What is desired to be claimed and secured by Letters Patent of the United States is:

1. In a cylinder scale or the like wherein the cylinder carries a chart having a zero reference line on its outer surface extending parallel to the axis of rotation of the cylinder, the improvement in an anti-parallax index assembly, comprising:

a. index band means having a relatively great width and a relatively small thickness,
   b. said index band means lying in a reading plane so as to define an index line when viewed on edge along said plane, c. said index band means being mounted for angular movement about an index axis lying in said reading plane,
d. said index axis extending parallel to the axis of rotation of said cylinder and being substantially coincidental with said zero reference line, and
e. means for angularly moving said index band means about said index axis to vary the angle of said reading plane while assuring maintainence of said zero reference line in said plane.

2. The improvement in an anti-parallax index assembly of claim 1 further characterized in that:
a. said index axis is spaced from said band means.

3. The improvement in an anti-parallax index assembly of claim 2 further characterized in that:
a. said index band means is mounted on frame means extending across said chart face, and
b. pivot means on said index axis mounting said frame means for rotation about said index axis.

4. The improvement in an anti-parallax index assembly of claim 1 further characterized in that:
a. said means for angularly moving said index band means comprising rotatable means mounted on the scale,
b. actuator arm means mounted on said frame and connected in lost-motion relationship with said rotatable means,
c. manipulation of said rotatable means effecting movement of said actuator arm to angularly move said index band means.

5. The improvement in an anti-parallax index assembly of claim 4 further characterized in that:
a. said lost-motion connection includes a slot formed in said actuator arm means and a pin on said frame means extending into said slot.

6. The improvement in an anti-parallax index assembly of claim 1 further characterized in that:
a. said index band means comprises ribbon means tensioned over said frame in said reading plane.

* * * * *